United States Patent
De Mattia et al.

(10) Patent No.: US 8,562,780 B2
(45) Date of Patent: *Oct. 22, 2013

(54) METHOD FOR MANUFACTURING A STIFFENED PANEL OF COMPOSITE MATERIAL

(75) Inventors: Denis De Mattia, Basse Goulaine (FR); Mathieu Lannuzel, Saint-Herblain (FR)

(73) Assignee: Airbus Operations SAS, Toulouse (FR)

( * ) Notice: Subject to any disclaimer, the term of this patent is extended or adjusted under 35 U.S.C. 154(b) by 101 days.

This patent is subject to a terminal disclaimer.

(21) Appl. No.: 13/186,902

(22) Filed: Jul. 20, 2011

(65) Prior Publication Data

US 2012/0024455 A1 Feb. 2, 2012

(30) Foreign Application Priority Data

Jul. 29, 2010 (FR) ...................................... 10 56263

(51) Int. Cl.
*B32B 37/14* (2006.01)
*B32B 38/00* (2006.01)

(52) U.S. Cl.
USPC .......................................... 156/245; 156/62.2

(58) Field of Classification Search
USPC ......................................................... 156/245
See application file for complete search history.

(56) References Cited

U.S. PATENT DOCUMENTS

| | | | |
|---|---|---|---|
| 5,527,414 A | 6/1996 | Dublinski et al. | |
| 2006/0108058 A1 | 5/2006 | Chapman et al. | |
| 2008/0290214 A1 * | 11/2008 | Guzman et al. | 244/119 |
| 2009/0127393 A1 | 5/2009 | Guzman et al. | |
| 2010/0320319 A1 * | 12/2010 | Liguore et al. | 244/119 |
| 2012/0024468 A1 * | 2/2012 | Chaume et al. | 156/243 |

FOREIGN PATENT DOCUMENTS

| | | | |
|---|---|---|---|
| EP | 1281504 A1 * | 2/2003 | |
| EP | 2 128 017 A1 | 12/2009 | |
| FR | 1 054 218 A | 2/1954 | |
| FR | 2 899 837 A1 | 10/2007 | |
| FR | 2899837 A1 * | 10/2007 | |
| JP | 03273084 A * | 12/1991 | |
| WO | 2008/064168 A2 | 5/2008 | |

OTHER PUBLICATIONS

French Search Report, dated Apr. 18, 2011, from corresponding French application.

* cited by examiner

*Primary Examiner* — Philip Tucker
*Assistant Examiner* — Vicki Wu
(74) *Attorney, Agent, or Firm* — Young & Thompson

(57) ABSTRACT

A process for the production of a stiffened panel made of composite material includes the stages of depositing the fibers that constitute the panel on a rigid device, depositing at least one stiffener, covering the unit with a sealed wall, and then polymerizing, and providing—for each stiffener—a rigid counter-mold in contact with the convex surface of the stiffener, covering the zone(s) of the panel that is/are not covered by the stiffener with at least one band sufficiently rigid to transmit compression forces by allowing play between the band and the stiffener, and then depositing a seal such that the seal, the band, and the rigid counter-mold form the sealed wall, whereby the seal is able to have two states, a first malleable state during application so that it adapts to the profile of the lateral edges of the stiffeners, and a hardened state to ensure transmission of compression forces in a manner essentially identical to the rigid counter-molds or to the bands arranged on either side of the seal so as not to generate a pressure gradient.

17 Claims, 2 Drawing Sheets

METHOD FOR MANUFACTURING A STIFFENED PANEL OF COMPOSITE MATERIAL

This invention relates to a process for manufacturing a stiffened panel made of composite material.

Figure 1:
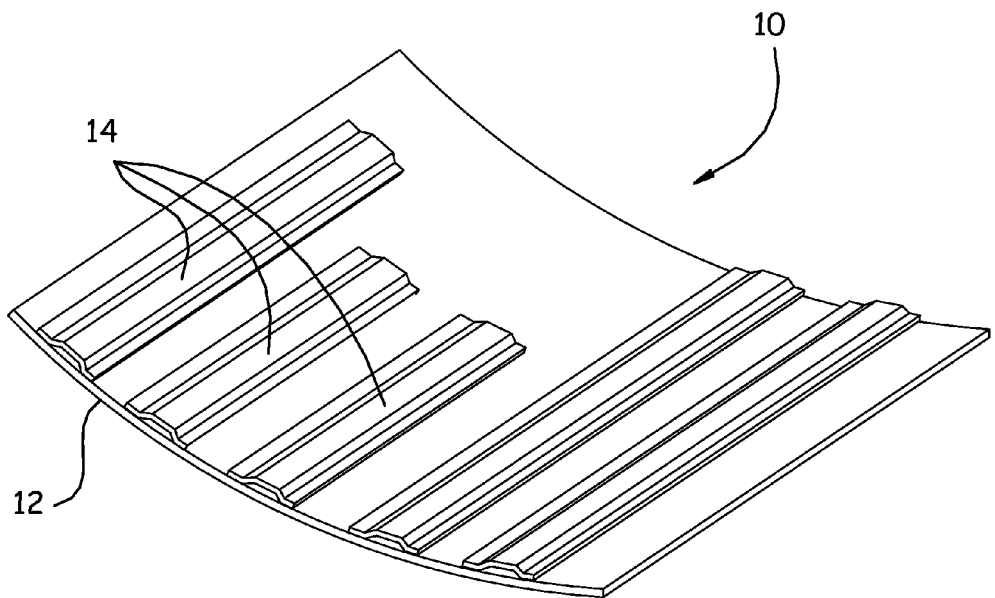

As illustrated in FIG. 1, a stiffened panel 10 comprises, on the one hand, a panel 12 that forms a skin and that consists of fibers that are woven in a resin matrix and, on the other hand, long-member reinforcements 14.

The invention relates more specifically to the long-member reinforcements that comprise a non-flat central part with caps on either side in contact with the panel once assembled, whereby said central part is separated from said panel to be reinforced. By way of example, this reinforcement can have an omega-shaped profile.

In the case of an aircraft, the fuselage comprises, on the one hand, a skin, and, on the other hand, a first series of stiffeners with Omega-shaped cross-sections, flattened against the inside surface of the skin and arranged in a longitudinal direction and also called stringers, and a second series of stiffeners arranged in planes that are perpendicular to the longitudinal direction and also called frames. Thus, the fuselage can come in the form of a stiffened panel or a set of juxtaposed stiffened panels connected to a structure that consists in particular of frames.

Figure 2:
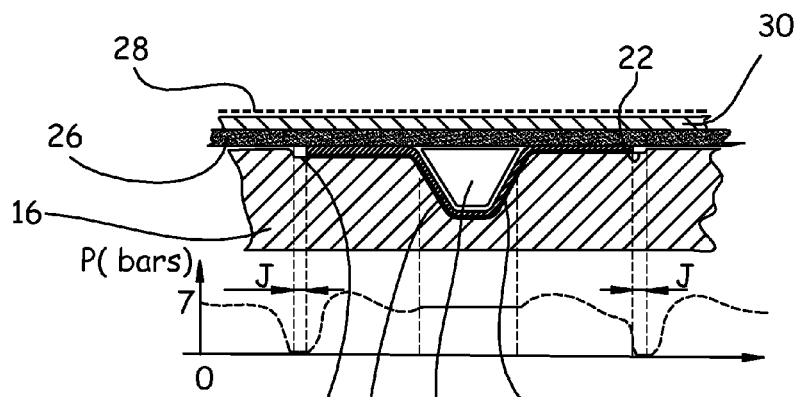

According to a first operating mode that is illustrated in FIG. 2, the stiffened panel is produced using a molding device 16 that is rigid in contact with the surface of the panel that comprises the stiffeners.

In this case, this rigid molding device 16 comprises grooves 18 whose profiles are matched to those of the stiffeners 20. Each groove 18 has a central part that corresponds to the central part of the stiffener with—on either side—hollow lateral housings 22 that are matched to the caps of the stiffener.

The depth of the lateral housings 22 is adapted to the thickness of the caps of the stiffener in such a way that the surface of the caps that will be flattened against the skin is essentially at the same level as the surface of the device 16 that will be in contact with the skin. Relative to the width of the lateral housings, there can be a play J between the end of each cap of the stiffener and the edge of the corresponding lateral housing 22.

After the installation of stiffeners, a core 24 is connected at the hollow shape of each stiffener 20.

After the installation of the cores 24, the deposition of fibers of the skin 26 is initiated. This operation can be performed using a draping machine or more generally a fiber-placing machine.

The core 24 is to be rigid enough to withstand compression forces generated by the machine during the deposition of fibers.

Prior to the polymerization, a flexible and sealed bladder 28, which comes into contact with the device 16 on the periphery of the panel, is connected to the unit. Drainage means are inserted between the skin 26 and the sealed bladder 28 to ensure the evacuation of gases during polymerization. Advantageously, a semi-rigid shaping plate 30 is inserted between the skin 26 and the bladder 28. Semi-rigid is defined as the shaping plate 30 being rigid enough to transmit compression forces to the skin and flexible enough to adapt to the radii of curvature of the skin.

Next, the unit is subjected to a polymerization cycle during which the walls of the stiffeners and the skin are compacted so as to reduce the porosity of said walls. Advantageously, each core 24 is placed in a bladder into which a pressurized gas is injected in such a way as to compact the walls of the stiffeners and the walls of the skin facing the core 24.

After the polymerization, the cores 24 are withdrawn.

This operating mode is not satisfactory on the following points:

When the play J is excessive, greater than 0.2 mm, during polymerization a pressure gradient develops perpendicular to this play J, which causes localized surface defects such as deviations of fibers. Furthermore, as illustrated in FIG. 2, perpendicular to the play J, the pressure exerted on the skin is not adequate so that the part can have too high a porosity.

According to another drawback, this pressure gradient generates a surface defect at the outside surface of the panel that has to be corrected by sealing.

According to another drawback, this operating mode requires the use of rigid cores, with dimensions calibrated to those of the recess of each stiffener, difficult to design and to use. Thus, with the stiffeners having different shapes, it is necessary to provide as many cores as shapes of stiffeners.

According to another point, these cores are difficult to extract, in particular because of the length of the stiffeners, general curves of the stiffeners or defects of local shape. In general, these cores are disposable and are dissolved for extracting them.

According to another drawback, a slight mismatch between the surface of the cap of the stiffener and the surface of the adjacent device can develop and produce localized surface defects at the skin.

Finally, according to another drawback, during polymerization, the skin is compacted between a rigid element, namely the device 16, and a semi-rigid element 30, which is sparingly compatible with a homogeneous compacting.

Figure 3:
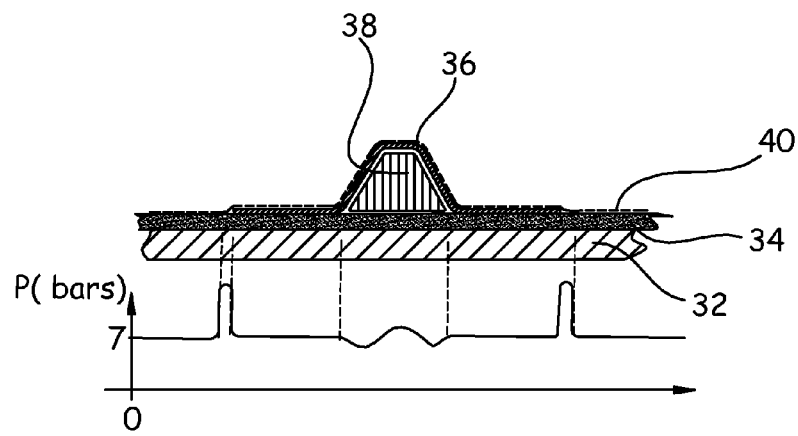

According to another operating mode illustrated in FIG. 3, the stiffened panel is produced using a rigid molding device 32 in contact with the surface of the panel that does not comprise stiffeners.

In a first step, the fibers that form the skin 34 are deposited on the device 32 whose surface in contact with said skin is shaped to the outside surface of the fuselage. This operation can be carried out using a draping machine or more generally using a fiber placement machine.

Next, the stiffeners 36 are arranged on the skin 34 by having taken care to insert a rigid core 38 between each stiffener and the skin.

Prior to the polymerization, a flexible and sealed bladder 40 that comes into contact with the device 32 on the periphery of the panel is connected to the unit. Drainage means are inserted below the flexible and sealed bladder 40 to ensure the evacuation of gases during polymerization.

Next, a second "comb"-type device that makes it possible to maintain the relative positions of the stiffeners during polymerization is connected. This second holding device comprises, for each stiffener, two elements that are supported on either side of the stiffener on the bladder.

Polymerization is then initiated. The cores 38 should be rigid enough to maintain the shape of the stiffeners during polymerization. They are withdrawn after this phase.

Like the preceding mode, this operating mode is not satisfactory for the following reasons:

Under the effect of pressure and despite the flexibility, the bladder cannot homogeneously compact the zone that corresponds to the end of the caps of the stiffener, taking into account the local discontinuity.

As illustrated in FIG. 3, this zone is subjected to high pressure gradients that cause surface defects at the inside surface of the panel, and even the embedding of the end of the cap in the skin.

Furthermore, this operating mode requires the use of a rigid core with the same drawbacks as those mentioned for the first operating mode.

As above, the pressure gradients also generate surface defects at the outside surface of the panel.

According to another drawback, it is very difficult, and even impossible, to place the flexible bladder in such a way that it exactly follows the profile of a surface that cannot be developed and that comprises in addition stiffeners on a large surface that can reach more than 70 m$^2$.

Finally, according to another drawback, the bladder can be used only for the manufacturing of a single panel and after its use constitutes scrap to be destroyed.

The purpose of this invention is to remedy the drawbacks of the operating modes of the prior art.

According to a first objective, its purpose is to propose a process for manufacturing a stiffened panel made of composite material that makes it possible to obtain a homogeneous compacting by limiting the appearance of pressure gradients.

For this purpose, the invention has as its object a process for the production of a stiffened panel made of composite material that comprises a panel that consists of fibers that are woven in a resin matrix and to one of the surfaces of which is connected at least one stiffener made of composite material in the form of a section whose cross-section comprises a non-flat central part with caps on either side in contact with the panel once assembled, whereby said central part is separated from said panel to be reinforced, with said process comprising the stages that consist in depositing the fibers that constitute the panel on a rigid device, in depositing said at least one stiffener on the surface of the panel by inserting a core between each stiffener and the panel, in covering the unit with a sealed wall connected to the rigid device on the periphery of the panel, and then in polymerizing the unit by subjecting it to pressure, characterized in that it consists in providing—for each stiffener—a counter-mold that is rigid in contact with the convex surface of the stiffener, the lateral edges of the rigid counter-mold not going beyond the lateral edges of the stiffener, in covering the zone(s) of the panel that is/are not covered by said at least one stiffener with at least one band that is rigid enough to transmit the compression forces by allowing play between said at least one band and said at least one stiffener, and then in depositing a seal in such a way that said seal, said at least one band, and said at least one rigid counter-mold form said sealed wall, whereby said seal is able to have two states, a first malleable state during its application in such a way that it adapts to the profile of the lateral edges of the stiffeners and a hardened state after the application, in particular during polymerization, to ensure the transmission of compression forces in a manner that is essentially identical to the rigid counter-molds or to the bands that are arranged on either side of said seal so as not to generate a pressure gradient.

According to another objective, the purpose of the invention is to propose a process for manufacturing a stiffened panel that makes it possible to simplify the extraction of cores after polymerization.

For this purpose, the invention proposes a process for the production of a stiffened panel, characterized in that it consists in using—for each stiffener—a core in the form of a flexible and sealed bladder.

Figure 4:
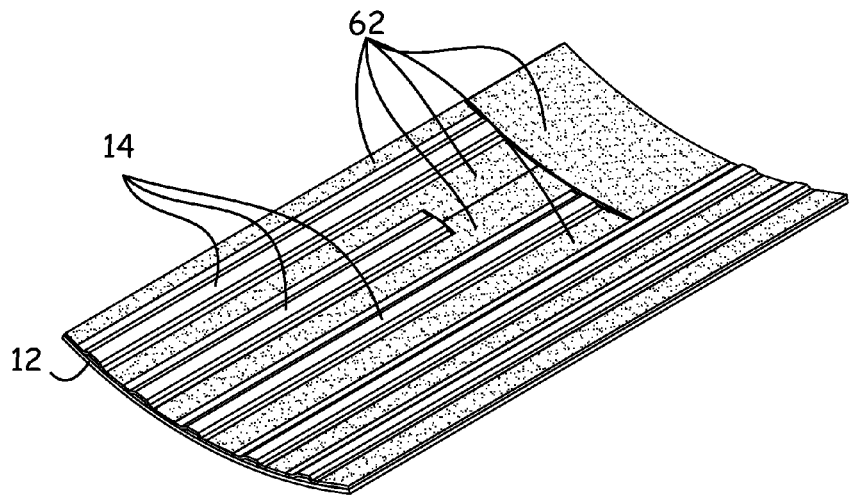
Figure 5:
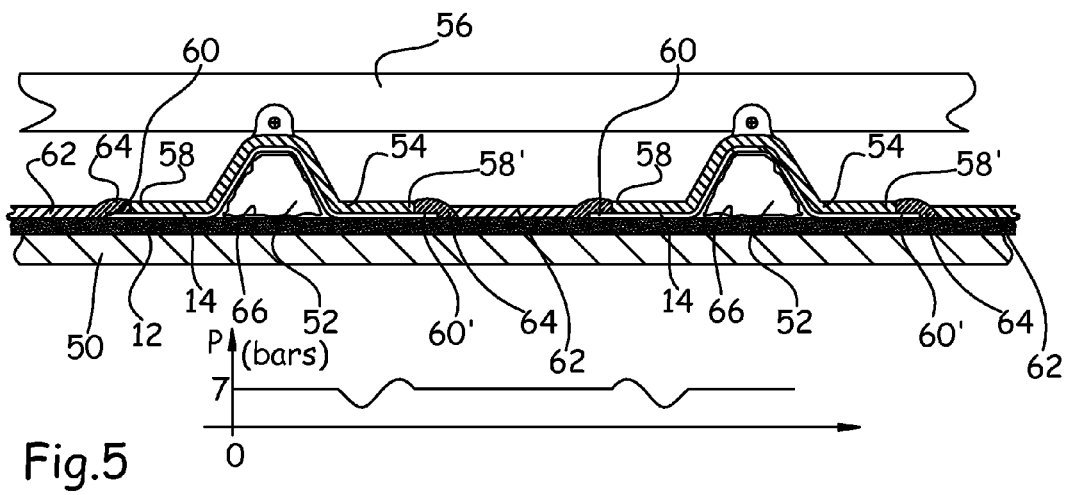
Figure 6:
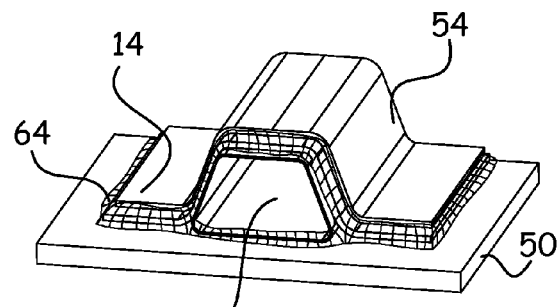
Figure 7:
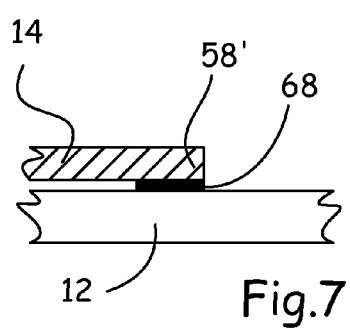

Other characteristics and advantages will emerge from the following description of the invention, a description that is provided only by way of example, relative to the accompanying drawings in which:

FIG. 1 is a perspective view of a stiffened panel that illustrates the surface that comprises the stiffeners, FIG. 2 is a cutaway that illustrates a device that makes it possible to implement a first operating mode according to the prior art, accompanied by a surface pressure diagram of the skin, FIG. 3 is a cutaway that illustrates a device that makes it possible to implement a second operating mode according to the prior art, accompanied by a surface pressure diagram of the skin, FIG. 4 is a cutaway that illustrates a stiffened panel that is equipped with a part of the device, FIG. 5 is a cutaway that illustrates a device that makes it possible to implement an operating mode according to the invention, accompanied by a surface pressure diagram of the skin, FIG. 6 is a perspective view that illustrates the device of FIG. 5 at the end of a stiffener, and FIG. 7 is a cutaway that illustrates in details the lateral edge of a stiffener on the panel during the implementation of the process of the invention.

A stiffened panel made of composite material 10 comprises, on the one hand, a panel 12 that forms a skin and that consists of fibers that are woven in a resin matrix, and, on the other hand, long-member reinforcements 14.

By way of example, this stiffened panel 10 can be used as part of a fuselage of an aircraft. In this case, the stiffeners are called stringers.

The panel 12 can be flat or have a curved or non-developable profile. Hereinafter, the surface of the panel on which the stiffeners are connected is called the inside surface, with the other surface being called the outside surface. The inside surface consists of zones covered by the stiffeners and uncovered zones.

According to a minimalist variant, the panel can comprise a single stiffener. Each stiffener comes in the form of a section whose cross-section comprises a non-flat central part with caps on either side in contact with the panel once assembled, whereby said central part is separated from said panel to be reinforced. By way of example, this reinforcement may have the shape of an omega.

As appropriate, the stiffener can have a constant or variable cross-section over its entire length. Likewise, the stiffener may or may not be rectilinear.

The shapes of the panel and stiffeners are not presented in more detail because they can vary based on the constraints applied to the panel.

In a first step, the stiffener(s) is/are produced independently. Several techniques can be considered, in particular the one that is described in the document FR-10.54218.

Advantageously, the stiffeners are partially polymerized in such a way as to be stable over the dimensional plane while allowing a final polymerization with the panel so as to obtain a simple and solid connection between the stiffener and the panel.

Preferably, the stiffener is produced by using a rigid mold in contact with the convex surface of the stiffener.

This rigid mold can be used not only for partial polymerization but also for manipulating the stiffener, with the latter being kept in its rigid mold. Advantageously, the rigid mold will constitute a part of the device that will make it possible to implement the operating mode of the invention as will be presented in detail below.

According to the operating mode of the invention, the first stage consists in depositing the fibers that constitute the panel 12 on a rigid device 50 that comprises an upper surface whose shapes are consistent with those of the outside surface of the panel.

This operation can be automated by using a machine for depositing layers of fibers, for example.

The mode for depositing fibers is not presented in more detail because it is within the scope of one skilled in the art.

Likewise, the types of fibers and resin are determined by one skilled in the art based on constraints applied to the panel.

In a second stage, the stiffener(s) 14 is/are connected to the inside surface of the panel 12 by having taken care to place a core 52 between each stiffener and the panel. Next, a device for holding stiffeners in place is deployed.

For each stiffener, this holding device comprises, on the one hand, a rigid counter-mold 54 that covers the stiffener 14, and, on the other hand, at least one connecting element 56 between two rigid counter-molds 54 in such a way as to couple them together. Preferably, at least one of the connecting elements 56 is connected to the rigid device 50.

Advantageously, the rigid mold that has served as a mold during the manufacturing of the stiffener is used as a rigid counter-mold 54. Thus, the stiffener 14 is always held in place in its mold from the installation of the fibers that constitute it up to its total polymerization with the panel. In this way, the stiffener is protected during manipulation phases whereas it is still fragile but not totally polymerized.

According to one characteristic of the invention, the rigid counter-mold 54 covers the entire convex surface of the stiffener, with the lateral edges 58, 58' of the rigid counter-mold 54 not going beyond the lateral edges 60, 60' of the stiffener. Advantageously, each lateral edge 58, 58' of the rigid counter-mold 54 is offset toward the central part of the stiffener relative to the corresponding lateral edge 60, 60' of the stiffener. The advantages obtained by this arrangement will be developed later.

After the installation of the stiffeners 14, at least one plate or band 62 of elastomer is applied on the uncovered inside surface zone(s) as illustrated in FIG. 4.

Preferably, the inside surface is covered by several blades or plates 62 that are juxtaposed with one another. These bands or plates can have different geometric shapes. Hereinafter, band is defined both as band and plate.

These bands 62 are rigid enough to exert an essentially homogeneous pressure on all of their surfaces. However, they can possibly deform by compression in such a way as to adapt to the roughness of the inside surface.

By way of example, the bands 62 are made of Mosite.

According to one characteristic of the invention, the bands 62 have shapes that are adapted in such a way that there is a play that is positive and less than 10 mm between the stiffeners and the band.

According to the invention, a seal 64 is applied in such a way as to ensure the seal between the rigid counter-molds and the bands.

This seal 64 is able to have two states, a first state that is malleable during its application in such a way that it adapts to the profile of the lateral edges of the stiffeners in such a way as not to allow a vacuum between the panel, the stiffener, the rigid counter-mold and the band, as illustrated in FIG. 5, and a hardened state after the application, in particular during polymerization, to ensure the transmission of compression forces in a manner that is essentially identical to the rigid counter-molds 54 or to the bands 62 that are arranged on either side of the seal so as not to generate a pressure gradient, as illustrated in the diagram that appears in FIG. 5.

The rigid counter-mold(s) 54, the band(s) 62, and the seal 64 form a wall that is connected by any suitable means to the rigid device 50 on the periphery of the panel in such a way as to form a sealed chamber.

According to one embodiment, the seal between, on the one hand, the rigid device 50 and, on the other hand, the rigid counter-mold(s) 54 and/or the band(s) 62 is ensured by using the seal 64.

The seal 64 should adhere sufficiently to the rigid counter-mold(s) 54, to the band(s) 62, and to the rigid device 50 for forming—with the rigid counter-molds 54, the bands 62, and the rigid device 50—a sealed chamber in which the panel and the stiffeners are deployed.

The seal 64 comes in the form of a putty bead, for example silicone.

The rigid counter-molds 54, the bands 62, and the seal 64 can be deposited manually or in an automated manner.

In the presence of several juxtaposed bands 62, the seal 64 can be used to ensure the seal between two adjacent bands 62.

According to an advantage obtained by the invention, the bands and the rigid counter-molds are reusable. Only the bead 64 is lost and constitutes scrap to be destroyed for each stiffened panel produced.

According to another characteristic of the invention, a core 66 in the form of a flexible and sealed bladder is arranged between each stiffener 14 and the panel 12.

In general, the stiffeners protrude at at least one of their ends. In this case, the flexible and sealed bladder 66 comes in the form of a flange with a protruding end at the protruding end of the stiffener, as illustrated in FIG. 6. This arrangement makes it possible to obtain an identical pressure in the bladder 66 and the environment outside of the chamber that is formed by the device, in particular during polymerization. Thus, a satisfactory compression of the panel is obtained under the stiffeners.

According to a particular arrangement, the bladder 66 has a length that is greater than that of the stiffener in such a way that the end of the bladder exceeds the stiffener. In the same manner, the stiffener 14 has a length that is greater than that of the counter-mold in such a way that the end of the stiffener exceeds the counter-mold.

As illustrated in FIG. 6, it is possible to use a seal 64 for ensuring the seal between the rigid counter-mold 54 and the bladder 66, between the rigid mold 54 and the rigid device 50, and between the rigid device 50 and the bladder 66.

For the installation of this seal, it is necessary that the bladder 66 be flattened against the walls of the stiffener, either by inflating said bladder 66 at a low pressure or by generating a negative pressure between the bladder and the stiffener.

Not being rigid, the bladder 66 can easily be withdrawn after the consolidation of the stiffened panel. In addition, it can be reused and is not disposable, which tends to reduce the amount of scrap.

According to another point of the invention, prior to the deposition of the seal 64, it is possible to provide a seal 68 between the lateral edges 60, 60' of the stiffeners and the panel so as to prevent the seal 64 from being introduced into the gap between cap and skin, as illustrated in FIG. 7. According to one embodiment, it is possible to make the lateral edges 60, 60' of the stiffeners adhere to the panel 12 by heating by means of, for example, a thermal roller.

Advantageously, drainage means can be inserted between the panel 12 and the rigid device 50 for evacuating the gases during polymerization. With the stiffeners having been shaped and compacted until contraction occurs during a preliminary partial polymerization, there is no gas to remove at the stiffener so that the drainage means do not need to be in contact with the stiffeners.

The invention claimed is:

1. A process for the production of a stiffened panel made of composite material, comprising:

producing a panel (12) comprising fibers woven in a resin matrix; and stiffening said panel by installing a stiffener (14) on one surface of said panel (12), said stiffener (14) made of composite material, said stiffener (14) having a cross-section comprising a non-flat central part, having a convex surface, with caps on either side of said central part, said caps in contact with said panel and said central part being separated from said panel, said caps terminating in lateral edges (60, 60') running a length of said stiffener (14), wherein said producing and stiffening steps comprise the stages of depositing the fibers that constitute said panel on a rigid device (50), depositing said stiffener (14) by inserting a core (52, 66) between said stiffener and the panel to thereby form a unit, covering the unit with a sealed wall connected to the rigid device (50) on a periphery of said panel, the sealed wall comprising i) a rigid counter-mold (54) placed in contact with the convex surface of said stiffener (14), lateral edges (58, 58') of the rigid counter-mold (54) not going beyond the lateral edges (60, 60') of said caps, ii) at least one band (62) covering zone(s) on said one surface of said panel (12) not covered by said stiffener (14), said at least one band (62) being rigid enough to transmit compression forces by allowing play between said at least one band (62) and said stiffener (14), and iii) a deposited seal (64) located between a lateral edge of said at least one band (62) and a corresponding lateral edge of said counter-mold (54), the seal (64) covering the lateral edges (60, 60') of said caps, said seal (64) having two states, a first malleable state during application of said seal (64) so that said seal (64) adapts to a profile of the lateral edges of the caps and a hardened state after the application and during a subsequent polymerization sufficient to ensure the transmission of compression forces in a manner that is essentially identical to the rigid counter-molds (54) and to the at least one band (62) so as not to generate a pressure gradient, and polymerizing the unit by subjecting the unit to pressure.

2. The process according to claim 1, wherein each lateral edge (58, 58') of said rigid counter-mold (54) is offset toward the central part of the stiffener relative to the corresponding lateral edge (60, 60') of the stiffener.

3. The process according to claim 1, wherein prior to installation of said stiffener, said stiffener is partially polymerized in such a way as to be stable over the dimensional plane while allowing a final polymerization with the panel.

4. The process according to claim 3, wherein the rigid counter-mold (54) serves in the partial polymerization of said stiffener.

5. The process according to claim 1, wherein, said stiffening step comprising installing plural of said stiffener (14), and said covering the unit with the sealed wall comprises coupling together plural of said rigid counter-molds (54).

6. The process according to claim 1, wherein the seal (64) is comprised of a silicone putty.

7. The process according to claim 1, wherein the core comprises a flexible and sealed bladder (66).

8. The process according to claim 7, wherein the flexible and sealed bladder (66) comes in the form of a flange with a protruding end at a level of a protruding end of the stiffener.

9. The process according to claim 7, wherein said seal (64) ensures a seal between the rigid counter-mold (54) and the bladder (66), between the bladder (66) and the rigid device (50), and between the rigid counter-mold (54) and the rigid device (50).

10. The process according to claim 1, comprising the further step of providing a seal (68) between the lateral edges (60, 60') of the stiffener and the panel so as to prevent said seal (64) from being introduced into a gap between cap and the one surface of said panel (12).

11. The process according to claim 2, wherein prior to installation of said stiffener, said stiffener is partially polymerized in such a way as to be stable over the dimensional plane while allowing a final polymerization with the panel.

12. The process according to claim 2, wherein, said stiffening step comprising installing plural of said stiffener (14), and said covering the unit with the sealed wall comprises coupling together plural of said rigid counter-molds (54).

13. The process according to claim 2, wherein the seal (64) is comprised of a silicone putty.

14. The process according to claim 2, wherein the core comprises a flexible and sealed bladder (66).

15. The process according to claim 8, wherein said seal (64) ensures a seal between the rigid counter-mold (54) and the bladder (66), between the bladder (66) and the rigid device (50), and between the rigid counter-mold (54) and the rigid device (50).

16. The process according to claim 2, comprising the further step of providing a seal (68) between the lateral edges (60, 60') of the stiffener and the panel so as to prevent said seal (64) from being introduced into a gap between cap and the one surface of said panel (12).

17. A process for the production of a stiffened panel made of composite material, comprising:

producing a panel (12) comprising fibers woven in a resin matrix; and stiffening said panel by installing plural stiffeners (14) on one surface of said panel (12), each said stiffener (14) made of composite material, each said stiffener (14) having a cross-section comprising a non-flat central part, having a convex surface, with caps on either side of said central part, said caps in contact with said panel and said central part being separated from said panel, said caps terminating in lateral edges (60, 60') running a length of said stiffener (14), wherein said producing and stiffening steps comprise the stages of depositing the fibers that constitute said panel on a rigid device (50), depositing each said stiffener (14) by inserting a core (52, 66) between each said stiffener and the panel to thereby form a unit, covering the unit with a sealed wall connected to the rigid device (50) on a periphery of said panel, the sealed wall comprising i) a rigid counter-mold (54) placed in contact with the convex surface of each said stiffener (14), lateral edges (58, 58') of the rigid counter-mold (54) not going beyond the lateral edges (60, 60') of said caps, ii) at least one band (62) covering zone(s) on said one surface of said panel (12) not covered by said stiffener (14), said at least one band (62) being rigid enough to transmit compression forces by allowing play between said at least one band (62) and each said stiffener (14), and iii) a deposited seal (64) located between each lateral edge of said at least one band (62) and a corresponding lateral edge of said counter-mold (54), the seal (64) covering the lateral edges (60, 60') of said caps, said seal (64) having two states, a first malleable state during application of said seal (64) so that said seal (64) adapts to a profile of the lateral edges of the caps and a hardened state after the application and during a subsequent polymerization sufficient to ensure the transmission of compression forces in a manner that is essentially identical to the rigid counter-molds (54) and to the at least one band (62) so as not to generate a pressure gradient, and polymerizing the unit by subjecting the unit to pressure.

* * * * *